United States Patent
Pang et al.

(10) Patent No.: US 9,214,831 B2
(45) Date of Patent: Dec. 15, 2015

(54) WIND CHARGER

(71) Applicant: ShenZhen Treasure City Technology Co., LTD., Shenzhen (CN)

(72) Inventors: Wei Pang, Shenzhen (CN); Al-Ling He, Shenzhen (CN); Wan-Li Ning, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 47 days.

(21) Appl. No.: 14/197,260

(22) Filed: Mar. 5, 2014

(65) Prior Publication Data
US 2014/0265999 A1    Sep. 18, 2014

(30) Foreign Application Priority Data
Mar. 15, 2013    (CN) .......... 2013 1 00830953

(51) Int. Cl.
*H02J 7/00* (2006.01)
*H02J 7/14* (2006.01)

(52) U.S. Cl.
CPC ............. *H02J 7/1415* (2013.01); *Y02E 10/721* (2013.01)

(58) Field of Classification Search
CPC ........................................................ H02J 7/35
USPC ............................................................ 320/101
See application file for complete search history.

(56) References Cited

U.S. PATENT DOCUMENTS

2012/0204577 A1*    8/2012    Ludwig .................. F25B 21/04
                                                                    62/3.3

* cited by examiner

*Primary Examiner* — Suresh Memula
(74) *Attorney, Agent, or Firm* — Novak Druce Connolly Bove + Quigg LLP

(57) ABSTRACT

A wind charger set on a circuit board for powering a button cell held by a holder set on the circuit board. The wind charger includes a bracket attached to the holder, a wind turbine fixed on the bracket and a charge circuit. The charge circuit is set on the circuit board. The wind turbine transfers airflow created by a heat-dissipating device set on the circuit board into electricity for powering the charge circuit, which charges the button cell.

8 Claims, 4 Drawing Sheets

WIND CHARGER

BACKGROUND

1. Technical Field

The present disclosure relates to a wind charger.

2. Description of Related Art

A button cell is usually arranged on a motherboard of a computer to supply power to a basic input/output system (BIOS) chip, thereby maintaining system data stored in the BIOS chip. However, when the voltage of the button cell falls below a certain value, not enough power will be produced to power the BIOS chip and if the button cell is not replaced in a timely manner, the system data could be lost.

Therefore, there is need for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
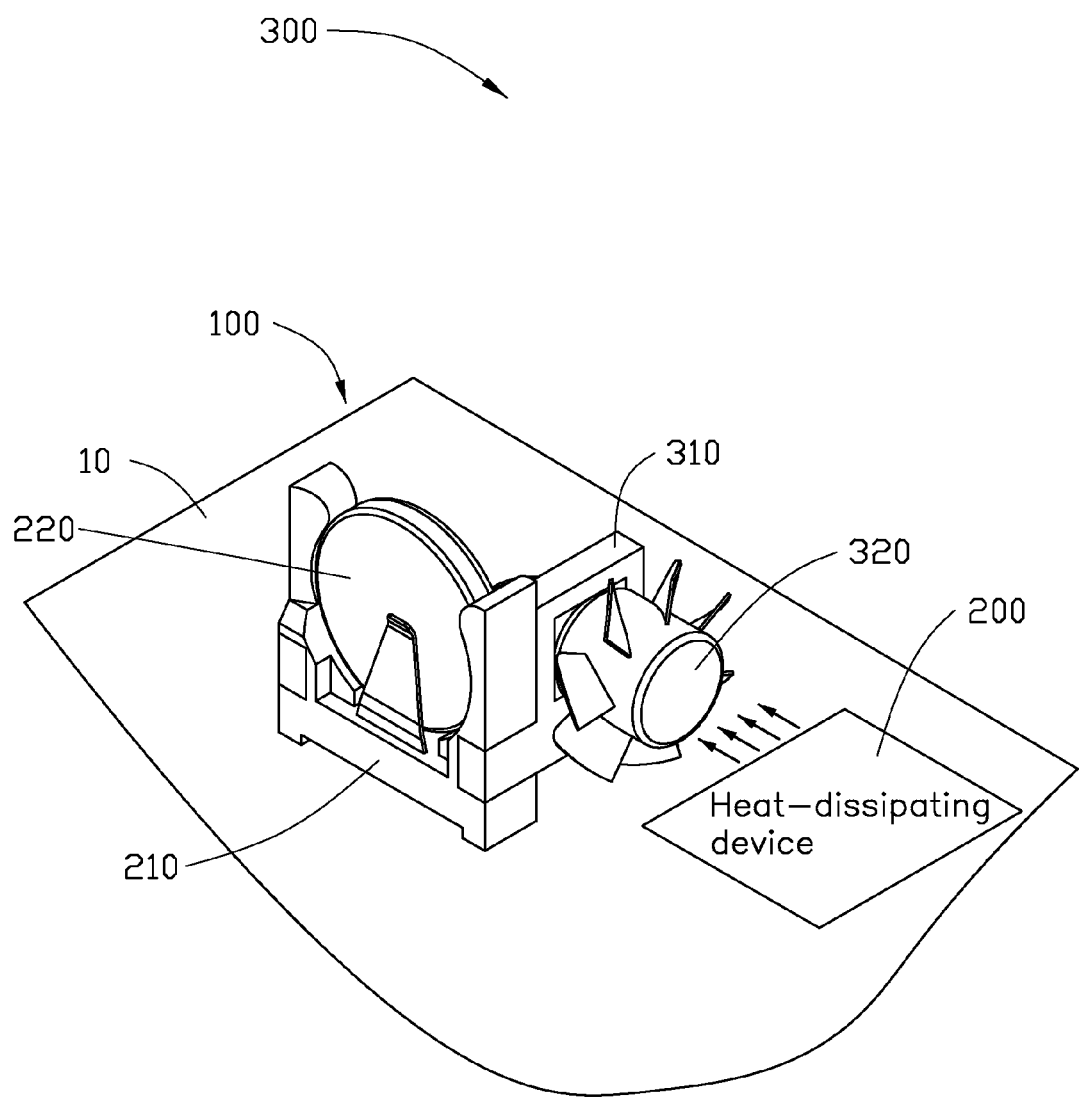
FIG. 1 is an assembled and isometric view of an embodiment of a wind charger, together with a circuit board, a heat dissipating device, a button cell, and a holder holding the button cell.

FIG. 1 shows a wind charger 100 set on a circuit board 10 of an electronic device, for powering a button cell 220 held by a holder 210 set on the circuit board 10.

Figure 2:
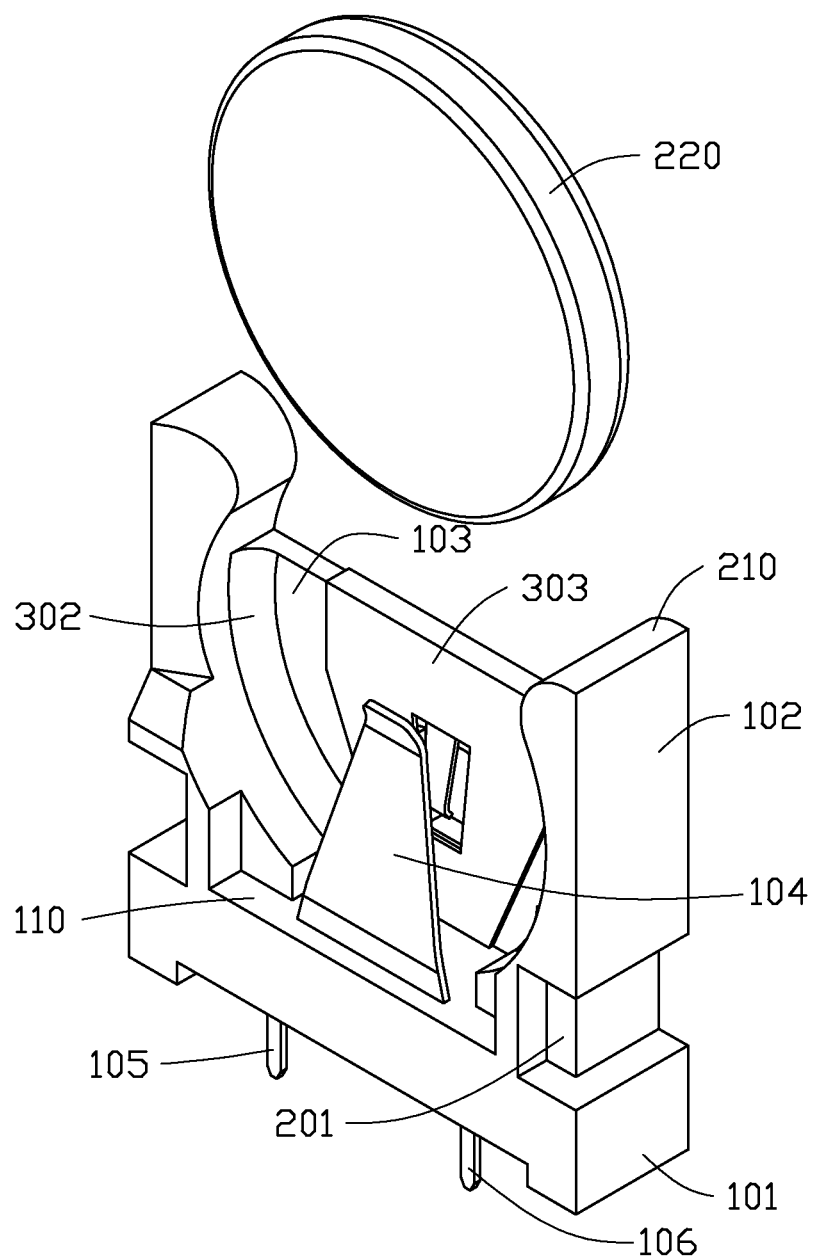
FIG. 2 is an explored and isometric view of the button cell and the holder of FIG. 1.
Figure 3:
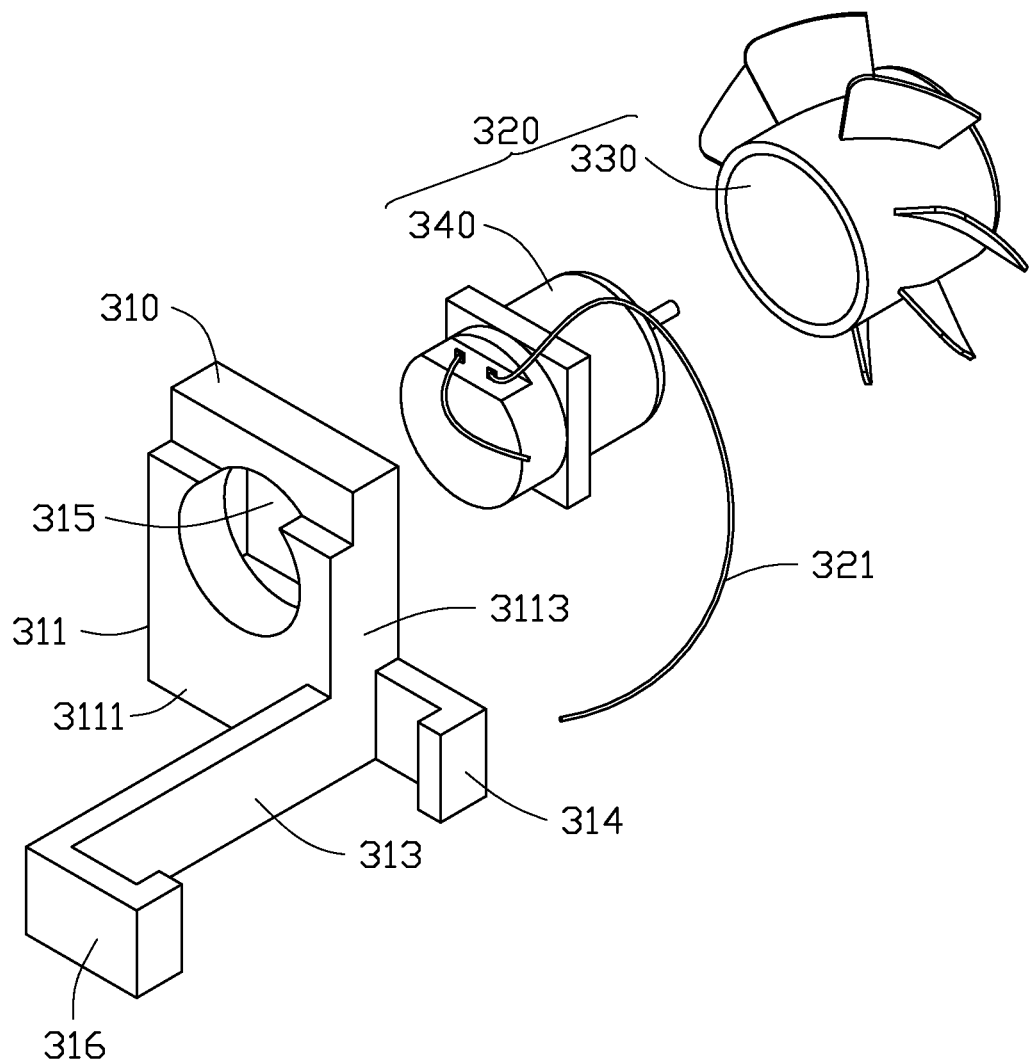
FIG. 3 is an explored and isometric view of a turbine of the wind charger of FIG. 1.
Figure 4:
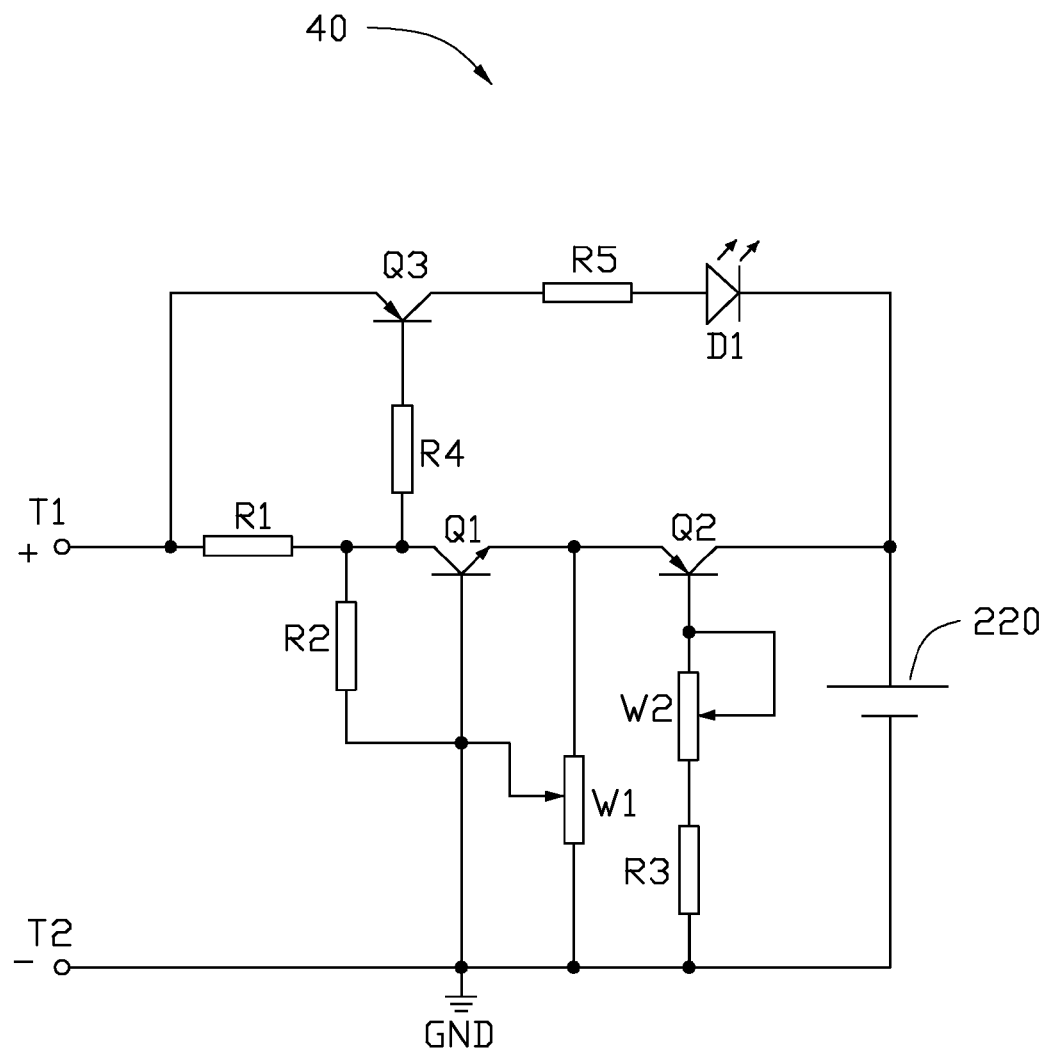
FIG. 4 is a charge circuit diagram of the wind charger.

FIGS. 2-4 show that the wind charger 100 includes a bracket 310 attached to the holder 210, a wind turbine 320 fixed on the bracket 310, and a charge circuit 40. The charge circuit 40 is set on the circuit board 10. The circuit board 10 includes a heat-dissipating device 200. In this embodiment, the heat-dissipating device 200 is a fan. When the electronic device is on and the heat-dissipating device 200 is running, the wind turbine 320 converts the kinetic energy of the airflow created by a heat-dissipating device 200 into electricity to power the charge circuit 40 which charges the button cell 220.

The holder 210 includes a base 101, two side walls 102 extending from an upper portion of the base 101, and a connecting wall 103 connected between the two side walls 102. Each side wall 102 defines a groove 201, adjacent to the base 101. An accommodating space 302 is formed between the connecting wall 103 and the two side walls 102, for accommodating the button cell 220. A deformable first conductive tab 303 extends from an inside of the connecting wall 103 for contacting an anode of the button cell 220. A deformable second conductive tab 104 extends from the upper portion of the base 101 for contacting a cathode of the button cell 220, facing the deformable first conductive tab 303. A first pin 105 and a second pin 106 extend through the base 101 and are electrically connected to the deformable first conductive tab 303 and deformable second conductive tab 104, respectively.

The first pin 105 and the second pin 106 are connected to the circuit board 10, for powering a BIOS chip set on the circuit board 10.

The bracket 310 includes a base member 311, an arm 313 perpendicularly extending from a side edge of a first sidewall 3111 of the base member 311. A first latching member 314 perpendicularly extends from a second sidewall 3113 of the base member 311. In addition, a second latching member 316 extends from a distal end of the arm 313, and facing the first latching member 314. The first latching member 314 and the second latching member 316 engage in the grooves 201 of the holder 210, for attaching the bracket 310 to the holder 210. A through hole 315 is defined in the base member 311, extending through the first sidewall 3111 and a sidewall of the base member 311 parallel to the first sidewall 3111.

The wind turbine 320 includes an impeller 330 and an energy converter 340. A first end of the energy converter 340 is fixed in the through hole 315. A second end of the energy converter 340 is assembled with the impeller 330. The energy converter 340 includes two wires 321.

FIG. 4 shows a diagram of the charge circuit 40. The charge circuit 40 includes electronic switches Q1-Q3, variable resistors W1-W2, a light emitting diode (LED) D1, a first terminal T1, and a second terminal T2. The first terminal T1 and the second terminal T2 are connected to the two wires 321, respectively. In the embodiment, the electronic switch Q1 is an npn bipolar junction transistor (BJT). Both of the electronic switches Q2 and Q3 are pnp bipolar junction transistors (BJTs).

A collector of the electronic switch Q1 is connected to the first terminal T1 through a resistor R1. A base of the electronic switch Q1 is connected to the control terminal of the variable resistor W1, and is connected to the second terminal T2. The collector of the electronic switch Q1 is also connected to a control terminal of the variable resistor W1 through a resistor R2. The base of the electronic switch Q1 is grounded. An emitter of the electronic switch Q1 is connected to a first end of the variable resistor W1, and is connected to an emitter of the electronic switch Q2. A second end of the variable resistor W1 is grounded. A base of the electronic switch Q2 is connected to a first end of the variable resistor W2. A second end of the variable resistor W2 is grounded through a resistor R3. A collector of the electronic switch Q2 is connected to the anode of the button cell 220. The cathode of the button cell 220 is connected to the second terminal T2 and is grounded.

An emitter of the electronic switch Q3 is connected to the first terminal T1. A base of the electronic switch Q3 is connected to the collector of the electronic switch Q1 through a resistor R4. A collector of the electronic switch Q3 is connected to an anode of the LED D1 through a resistor R5. A cathode of the LED D1 is connected to the anode of the button cell 220.

In use, airflow created by the heat-dissipating device 200 rotates the impeller 330 of the wind turbine 320. The wind turbine 320 receives the mechanical energy from the heat-dissipating device 200 and converts the received mechanical energy to electricity, and is transmitted to the charge circuit 40 through the two wires 321. The electronic switches Q1-Q3 are turned on, the LED D1 is lit, and the button cell 220 is charged. The resistance of the variable resistor W1 is adjusted by testers when debugging or troubleshooting the charge circuit 40 at the manufacturer during production, to further adjust an appropriate voltage between the collector and the emitter of the electronic switch Q3, preventing the LED D1 from damaged due to an over-voltage.

When the button cell 220 is charged to the rated capacity, the resistance of the variable resistor W is adjusted by testers when debugging or troubleshooting the charge circuit 40 at the manufacturer during production or during maintenance, so that the voltage between the collector and the emitter of the electronic switch Q2 is 0 volt. Therefore, the button cell 220 is not charged. At this time, a voltage of the cathode of the LED D1 is greater than a voltage of the anode of the LED D1 and the LED D1 is turned off. Thus, when the electronic device is off, the button cell 220 is still capable of powering the chips set on the circuit board 10, preventing system data loss.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A wind charger for powering a button cell held by a holder set on a circuit board, the circuit board comprising a heat-dissipating device capable of creating airflow, the wind charger comprising:
   a bracket attached to the holder;
   a wind turbine fixed on the bracket; and
   a charge circuit set on the circuit board;
   wherein the wind turbine converts the kinetic energy of the airflow created by the heat-dissipating device into electricity to power the charge circuit to charge the button cell.

2. The wind charger of claim 1, wherein the wind turbine comprises an impeller and an energy converter with two wires; a first end of the energy converter is fixed in a through hole defined in the bracket; a second end of the energy converter is attached to the impeller.

3. The wind charger of claim 2, wherein the bracket comprises a base member, an arm, a first latching member and a second latching member; the arm perpendicularly extends from a side edge of a first sidewall of the base member; the first latching member perpendicularly extends from a second sidewall of the base member, the second sidewall is perpendicular to the first sidewall; the second latching member extends from a distal end of the arm, facing the first latching member; the through hole is defined in the base member.

4. The wind charger of claim 3, wherein the first latching member and the second latching member engage in two grooves respectively defined in the holder.

5. The wind charger of claim 2, wherein the charge circuit comprises first to third electronic switches, a first variable resistor, a second variable resistor, a first terminal and a second terminal connected to the wires;
   wherein a first end of the first electronic switch is connected the first terminal through a first resistor; a second end of the first electronic switch is connected to the control terminal of the first variable resistor, and is connected to the second terminal; a third end of the first electronic switch is grounded through the first variable resistor; a control terminal of the first variable resistor is connected to the first end of the first electronic switch through a second resistor;
   wherein a third end of the second electronic switch is connected to the third end of the first electronic switch; a second end of the second electronic switch is connected to the second terminal through the second variable resistor and a third resistor; a first end of the second electronic switch is connected to the anode of the button cell; the cathode of the button cell and the second terminal are grounded; and
   wherein a third end of the third electronic switch is connected to the first terminal; a second end of the third electronic switch is connected to first end of the first electronic switch through a fourth resistor; a first end of the third electronic switch is connected to the anode of the button cell.

6. The wind charger of claim 5, wherein the charge circuit further comprises a light emitting diode (LED), an anode of the LED is connected to the first end of the third electronic switch through a fifth resistor, a cathode of the LED is connected to the anode of the button cell.

7. The wind charger of claim 6, wherein the anode and cathode of the button cell contact two conductive tabs set in the holder, the two conductive tabs are connected to two pins electronically connecting a chip set on the circuit board.

8. The wind charger of claim 7, wherein the first electronic switch is a npn bipolar junction transistor (BJT), both of the second and third electronic switches are pnp bipolar junction transistors (BJTs), the first to third ends of each electronic switch correspond to a collector, a base, and an emitter of the BJT, respectively.

* * * * *